US012710148B1

(12) United States Patent
Zheng

(10) Patent No.: US 12,710,148 B1
(45) Date of Patent: Aug. 18, 2026

(54) SOFFIT LIGHT

(71) Applicant: Hangzhou Juxing Intelligent Technology Co., Ltd., Hangzhou (CN)

(72) Inventor: Hongbing Zheng, Hangzhou (CN)

(73) Assignee: Hangzhou Juxing Intelligent Technology Co., Ltd., Hangzhou (CN)

( * ) Notice: Subject to any disclaimer, the term of this patent is extended or adjusted under 35 U.S.C. 154(b) by 0 days.

(21) Appl. No.: 19/189,310

(22) Filed: Apr. 25, 2025

(30) Foreign Application Priority Data

Mar. 31, 2025 (CN) ......................... 202520592670.0

(51) Int. Cl.

*F21S 8/04* (2006.01)
*F21S 2/00* (2016.01)
*F21S 4/28* (2016.01)
*F21V 21/03* (2006.01)

(52) U.S. Cl.

CPC ............... *F21S 8/043* (2013.01); *F21S 2/005* (2013.01); *F21S 4/28* (2016.01); *F21V 21/03* (2013.01)

(58) Field of Classification Search

CPC ... F21S 8/043; F21S 4/28; F21S 2/005; F21V 21/03

See application file for complete search history.

(56) References Cited

U.S. PATENT DOCUMENTS 10,845,036 B2 * 11/2020 Shao .......................... F21S 4/26
11,353,175 B1 * 6/2022 Xie ........................ F21V 17/101
12,467,612 B1 * 11/2025 Kelley .................... F21S 8/036
2005/0221659 A1 * 10/2005 Mrakovich ............... F21S 4/10 439/404
2006/0197474 A1 * 9/2006 Olsen ..................... H05B 47/22 315/312
2009/0147509 A1 * 6/2009 Reed ..................... F21V 21/002 362/418
2009/0279298 A1 * 11/2009 Mier-Langner ....... F21V 21/096 362/373
2011/0194292 A1 * 8/2011 Tsai .......................... F21S 4/10 362/231
2015/0159844 A1 * 6/2015 Flaherty .................... F21S 4/10 362/249.02
2018/0259167 A1 * 9/2018 Krieger ................. F21V 23/001
2022/0082217 A1 * 3/2022 Shao .................... H10H 20/857
2023/0037351 A1 * 2/2023 Liu ....................... F21V 21/008
2024/0035652 A1 * 2/2024 Dai ...................... H05B 45/325
2025/0198602 A1 * 6/2025 Guo .......................... F21S 4/10

* cited by examiner

*Primary Examiner* — Leah Macchiarolo
(74) *Attorney, Agent, or Firm* — IPRTOP LLC

(57) ABSTRACT

The soffit light comprises a waterproof light strip, which is provided with a transparent housing and multiple light-emitting modules arranged at equal intervals along a length direction of the waterproof light strip, and multiple mounting units corresponding to the light-emitting modules. Each mounting unit includes a mounting base provided with a horizontal support element and configured to load the light-emitting module, an upper cover including a light-transmitting top plate and an annular sidewall extending vertically from a periphery of the light-transmitting top plate, and a buckle assembly configured to lock the mounting base and the upper cover to clamp and fix the light-emitting module between the horizontal support element and the light-transmitting top plate. The soffit light is overall waterproof and has a simple structure, which significantly improves the waterproof reliability and service life.

10 Claims, 2 Drawing Sheets

SOFFIT LIGHT

FIELD OF THE INVENTION

The present disclosure belongs to the technical field of lighting equipment, and in particular to a soffit light.

BACKGROUND OF THE INVENTION

At present, the commercially available soffit lights mainly include the following: the first type of soffit light involves light-emitting modules that are individually provided with a waterproof encapsulation structure and in electrical connection through metal inline connectors. This type of soffit light requires waterproof treatment (e.g., by potting and sealing) to be performed on each light-emitting module individually and then assembly of light-emitting modules to form a light strip through inline connectors. The second type of soffit light involves light-emitting modules pre-welding on a flexible printed circuit board, wherein each of the light-emitting modules is individually provided with a waterproof encapsulation structure using an ultrasonic welding process.

However, both the above two types of soffit light have complex structures and low assembly efficiency. Specifically, the former type requires waterproof treatment and plug-in assembly for each module, and the latter type relies on high-precision welding or ultrasonic sealing technique. Additionally, under the influence of environmental factors such as outdoor temperature difference and humidity, the weak part of the waterproof structure, such as the connection points of the connectors are easily affected by stress, thus leading to leakage. Minor defects formed in the local sealing process or material aging also lead to a drop in waterproof performance, which ultimately causes short circuit or severe lumen depreciation, making it difficult to meet the needs of long-term and stable use.

Therefore, developing a soffit light with a simple structure, excellent waterproof performance, and easy assembly is still challenging and urgent.

SUMMARY OF THE INVENTION

The present disclosure provides a soffit light, which simplifies the production process while achieving full-path waterproofing and ensuring continuous distribution of the light field.

The present disclosure provides a soffit light, comprising: a waterproof light strip, multiple mounting units, and a buckle assembly. The waterproof light strip is provided with a transparent housing and multiple light-emitting modules arranged at equal intervals along a length direction of the waterproof light strip. The mounting units correspond to the light-emitting modules, respectively, and each mounting unit includes a mounting base and an upper cover. The mounting base is provided with a horizontal support element and configured to load one light-emitting module. The upper cover includes a light-transmitting top plate and an annular sidewall extending vertically from a periphery of the light-transmitting top plate, wherein the left and right sides of the annular sidewall are symmetrically provided with a limiting groove to allow the waterproof light strip to pass through the mounting unit. The buckle assembly is configured to lock the mounting base and the upper cover to clamp and fix the light-emitting module between the horizontal support element and the light-transmitting top plate.

In one embodiment of the present disclosure, the light-transmitting top plate is provided with a lens. The lens covers a light-emitting surface of the light-emitting module and has a preset diffusion angle, so that light spots of adjacent light-emitting modules of the multiple light-emitting modules form a continuous and seamless superimposed lighting region.

In one embodiment of the present disclosure, the preset diffusion angle is $80° \leq a \leq 120°$.

In one embodiment of the present disclosure, the buckle assembly includes at least one pair of bosses circumferentially spaced and distributed on the horizontal support element of the mounting base and recesses correspondingly provided on the annular sidewall of the upper cover. When the upper cover is snapped onto the mounting base, the at least one pair of bosses engage the recesses to form locking.

In one embodiment of the present disclosure, the mounting base further includes a lateral mounting element perpendicular to the horizontal support element; a first mounting hole is provided on the horizontal support element, and a second mounting hole is provided on the lateral mounting element to realize ceiling mounting or lateral mounting of the soffit light.

In one embodiment of the present disclosure, the horizontal support element and the lateral mounting element are integrally formed.

In one embodiment of the present disclosure, an edge of the limiting groove in contact with the waterproof light strip is provided with a sawtooth structure for clamping and securing the waterproof light strip.

In one embodiment of the present disclosure, an interval between adjacent light-emitting modules is 10 $mm \leq L \leq 80$ mm.

In one embodiment of the present disclosure, the upper cover and the mounting base are both made of UV-resistant modified polycarbonate.

As described above, the soffit light described in the present disclosure has the following beneficial effects.

(1) By integrating the multiple light-emitting modules into the waterproof light strip with the transparent housing and cooperating with the buckle structure of the mounting units, an overall waterproof sealing is achieved, which effectively prevents the risk of leakage caused by the connectors or local sealing in the conventional solution, and significantly improves the waterproof reliability and service life of the product.

(2) The design of the detachable structure of the mounting units and the waterproof light strip in combination with the multi-directional mounting makes it convenient for quick on-site assembly, as well as maintenance and replacement, therefore, the soffit light can adapt to different mounting scenarios such as top or side mounting, greatly improving construction convenience and application flexibility.

(3) By providing the lens with a specific diffusion angle (80°-120°) on the light-transmitting top plate, the light spots of the adjacent light-emitting modules form the seamless and superimposed lighting region, effectively eliminating the light-and-dark striping produced by conventional discrete layout and obtaining a more uniform and continuous illumination.

(4) The mounting base and the upper cover are made of UV-resistant modified polycarbonate by the integral molding process, and the limiting grooves with the sawtooth structure are also used, which enhances the structural strength and anti-aging performance, and ensures the firm fixation of the waterproof light strip, allowing the product to withstand harsh outdoor environments for a long time.

REFERENCE NUMERALS

Figure 1:
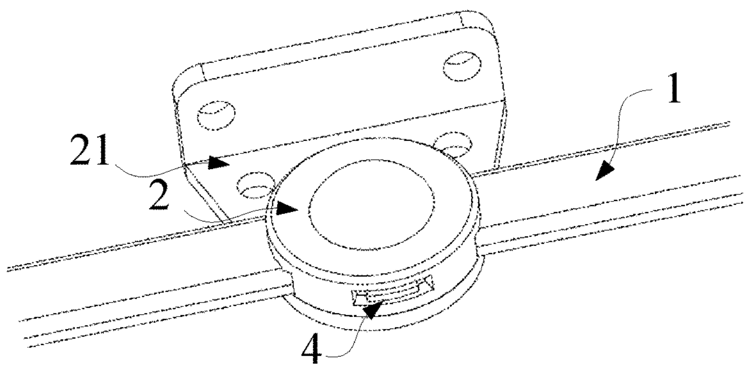
FIG. 1 is a schematic structural diagram of a soffit light according to an embodiment of the present disclosure.

1 Waterproof light strip
11 Light-emitting module
12 Transparent housing
13 Internal substrate
2 Mounting unit
21 Mounting base
211 Horizontal support element
212 Lateral mounting element
213 First mounting hole
214 Second mounting hole
22 Upper cover
221 Light-transmitting top plate
222 Annular sidewall
223 Limiting groove
224 Sawtooth structure
3 Lens
4 Buckle assembly
41 Boss
42 Recess

DETAILED DESCRIPTION OF THE INVENTION

The following describes the embodiments of the present disclosure through specific examples. Those skilled in the art can easily understand other advantages and effects of the present disclosure from the contents disclosed in this specification. The present disclosure may also be implemented or applied through other different specific embodiments, and the details in this specification may also be modified or changed in various ways based on different viewpoints and applications without departing from the spirit of the present disclosure. It should be noted that the following embodiments and features therein may be combined with each other if there is no conflict.

It should be noted that the illustrations provided in the following embodiments schematically show the basic concept of the present disclosure, and thus the drawings only show components related to the present disclosure rather than being drawn according to the number, shape, and size of components in actual implementation. In actual implementation, the type, quantity, and proportion of each component may be changed arbitrarily, and the component layout may also be more complicated.

In addition, in the present disclosure, descriptions such as "first", "second", etc. are only used for descriptive purposes and should not be understood as indicating or suggesting their relative importance or implicitly indicating the number of the indicated technical features. Therefore, the features defined as "first" or "second" may explicitly or implicitly include at least one of those features. In addition, the technical solutions between the various embodiments can be combined with each other based on the fact that those having ordinary skills in the art can implement it. When the combination of technical solutions is contradictory or cannot be implemented, it should be deemed that such a combination of technical solutions does not exist and is not within the scope of protection required by the present disclosure.

The following embodiments of the present disclosure disclose a soffit light, which simplifies the production process and realizes full-path waterproofing while ensuring continuous distribution of the light field.

The present embodiment provides a soffit light, as shown in FIG. 1, which mainly includes a waterproof lamp strip 1, mounting uniting 2, and a buckle assembly 4. The structure and assembly relationship of each component are described in detail below with reference to the accompanying drawings.

The waterproof light strip 1 is provided with a transparent housing 12 and multiple light-emitting modules 11 arranged at equal intervals along a length direction of the waterproof light strip 1.

Figure 2:
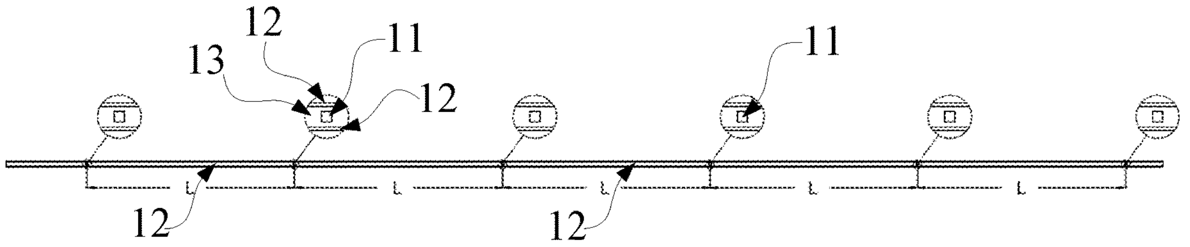
FIG. 2 is a schematic structural diagram of a waterproof light strip according to an embodiment of the present disclosure.

Specifically, as shown in FIG. 2, the waterproof light strip 1 includes the transparent housing 12 and an internal substrate 13, wherein the transparent housing 12 and the internal substrate 13 form an integrated sealing structure, and the housing is mounted around the outside of the substrate to form a continuous waterproof layer. Along the length direction of the waterproof light strip 1, the multiple light-emitting modules 11 are fixed on the substrate at equal intervals, and each module is electrically connected via a flexible printed circuit (flex circuit).

In some embodiments, the interval between the light-emitting modules 11 is adjustable, and the precise control of the interval between the light-emitting modules 11 on the substrate is achieved through a snap-fit positioning structure of the light-emitting modules, so that the interval between adjacent light-emitting modules can be flexibly set within a range of 10 mm to 80 mm according to lighting requirements.

One mounting unit 2 is independently provided for each of the light-emitting modules 11.

Figure 3:
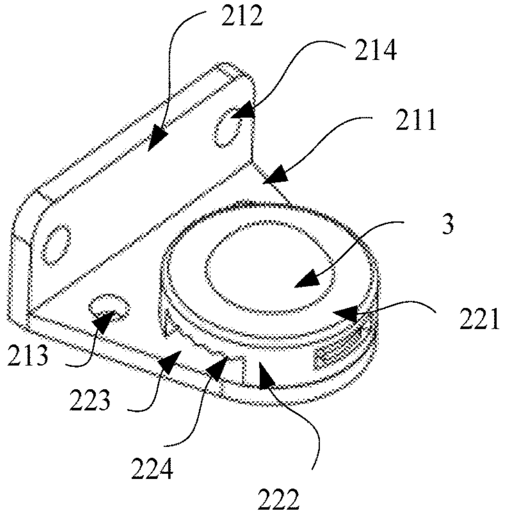
FIG. 3 is a schematic structural diagram of a mounting unit according to an embodiment of the present disclosure.

Specifically, each light-emitting module 11 is correspondingly provided with a mounting unit 2, as shown in FIG. 3, the mounting unit 2 includes a mounting base 21 and an upper cover 22.

Figure 4:
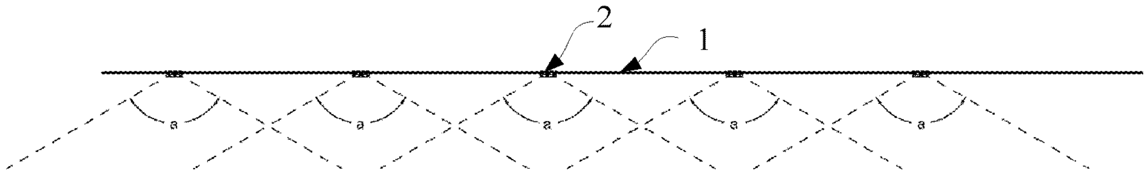
FIG. 4 is a schematic diagram of ceiling mounting of the soffit light according to an embodiment of the present disclosure.

The mounting base 21 is provided with a horizontal support element 211, and a positioning region adapted to the shape of the light-emitting module 11 is provided in the middle of the horizontal support element for accurately carrying and fixing the corresponding light-emitting module 11. The periphery of the horizontal support element is provided with first mounting holes 213 through which the ceiling mounting of the soffit light can be achieved by bolts or screws, as shown in FIG. 4. FIG. 4 is a schematic diagram of ceiling mounting of the soffit light.

Figure 5:
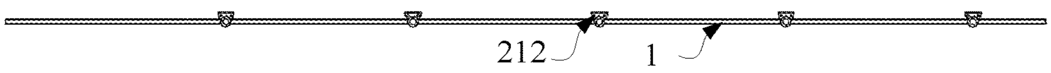
FIG. 5 is a schematic diagram of lateral mounting of the soffit light according to an embodiment of the present disclosure.

In a further embodiment, the mounting base 21 has an L-shaped structure, wherein a lateral mounting element 212 is vertically provided at one end of the horizontal support element 211. The periphery of the lateral mounting element 212 is provided with second mounting holes 214 for fixing the soffit light to a vertical wall surface or a column surface, thereby realizing lateral mounting, as shown in FIG. 5. FIG. 5 is a schematic diagram of lateral mounting of the soffit light.

For example, the horizontal support element 211 and the lateral mounting element 212 are seamlessly connected through an integral injection molding process, and reinforcing ribs are provided at a connection point of the horizontal support element 211 and the lateral mounting element 212 to improve the rigidity of the overall structure and ensure the bearing stability under different mounting directions (for example, ceiling mounting and lateral mounting).

The upper cover 22 includes a light-transmitting top plate 221 and an annular sidewall 222, wherein the annular sidewall 222 extends vertically from the periphery of the light-transmitting top plate 221.

Specifically, the left and right sides of the annular sidewall 222 are symmetrically provided with limiting grooves 223, wherein the limiting grooves 223 allow the waterproof light strip 1 to pass through the mounting unit 2, thereby forming a continuous arrangement of the waterproof light strip 1.

In some embodiments, an edge of each of the limiting grooves 223, which is in contact with the waterproof light strip 1, is provided with a continuous sawtooth structure 224. When the light strip is inserted into the limiting grooves, sharp serration of the sawtooth structure interlocks with the surface of the light strip, effectively preventing the light strip from axial shift or radial loosening after mounting.

The light-transmitting top plate 221 covers a light-emitting surface of the light-emitting module 11, and an inner surface of the light-transmitting top plate 221 is provided with a lens 3 through an in-mold injection molding process to adjust light distribution.

Specifically, the lens 3 has a convex structure. The surface facing the light-emitting module of the lens 3 is parallel to the light-emitting surface of the light-emitting module 11, and the surface opposite the light-emitting module of the lens 3 passes through the light-transmitting top plate 221 to form an arc-shaped protrusion, so that light refracting by the lens 3 forms hill-shaped light spots featuring a bright center and edges with gradually diminishing intensity. An annular groove is provided on the periphery of the lens 3, which matches with a positioning boss at an inner side of the light-transmitting top plate 221 to ensure that an optical axis of the lens 3 coincides with a central axis of the light-emitting module 11 after mounting.

In some embodiments, the diffusion angle of the lens 3 is in a range of 80°-120°.

Specifically, the surface facing the light-emitting module of the lens 3 is provided with micro-prism structures distributed in concentric circles. By adjusting a radius of curvature of each prism unit of the micro-prism structures, the light is distributed in a shape featuring a concentrated center and edges with gradual diffusion along the horizontal direction. When the diffusion angle of the lens 3 of each adjacent light-emitting modules 11 is within 80°-120°, each module projects the hill-shaped light spot to form a continuous light band, with overlapping high-intensity centers and smoothly blended edge regions. The high-intensity regions of adjacent light spots overlap with each other, and the edge regions of adjacent light spots merge seamlessly, completely eliminating the light and dark boundaries typical of the conventional discrete layout of light spots.

For example, the edge of the lens 3 is subjected to a gradient frosted treatment to further soften the brightness change at the edge of the light spots and improve visual uniformity.

In some embodiments, the upper cover 22 and the mounting base 21 are made of a UV-resistant modified polycarbonate material.

Specifically, the material is modified by adding an ultraviolet absorber and a light stabilizer to the polycarbonate, thus having excellent weather resistance, and effectively resisting yellowing and embrittlement caused by ultraviolet radiation. The modified material maintains good light transmittance while possessing good mechanical strength and dimensional stability, and has a long lifetime in outdoor environments without obvious aging. The surface hardness of the modified material reaches HB level, and the modified material has excellent impact resistance, thereby ensuring the durability of the soffit light in harsh weather conditions.

The buckle assembly 4 is configured to connect the mounting base 21 and the upper cover 22, and clamp and fix the light-emitting module 11 between the horizontal support element 211 and the light-transmitting top plate 221.

In some embodiments, the buckle assembly 4 adopts a symmetrically distributed mechanical locking structure, including bosses 41 on the mounting base 21 and recesses 42 on the upper cover 22.

Figure 6:
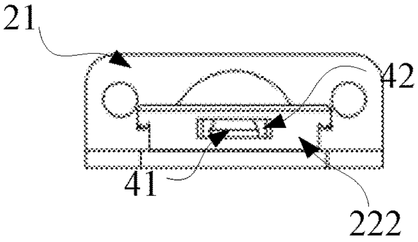
FIG. 6 is a schematic structural diagram of a buckle assembly according to an embodiment of the present disclosure.

Specifically, as shown in FIG. 6, the bosses 41 are circumferentially arranged along the periphery of the horizontal support element 211 of the mounting base 21 at equal intervals, and each boss 41 is in the shape of a hook, with a reinforcing structure at one end to enhance shear strength and an inclined guide surface formed at the other end. A lower part of the annular sidewall 222 of the upper cover 22 is provided with the recesses 42 which correspondingly match the number and position of the bosses 41, and wedge-shaped locking surfaces complementary to the hook are provided inside these recesses.

Figure 7:
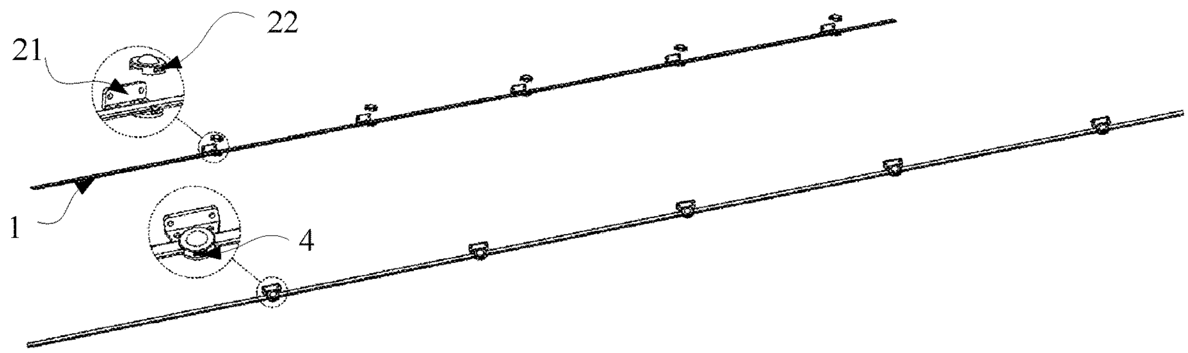
FIG. 7 is a schematic diagram of mounting of the soffit light according to an embodiment of the present disclosure.

As shown in FIG. 7, when the upper cover 22 is snapped onto the mounting base 21, the guide surface of the boss 41 engages the edge of the recess first, forcing the annular sidewall 222 to produce elastic deformation until the hook completely enters the recess. At this point, the wedge-shaped locking surface bears flush against the tip of the hook to lock them in place, while the sidewall's rebound generates a force to securely clamp the light-emitting module 11 between the horizontal support element 211 and the light-transmitting top plate 221. An elastic sealing member seated in a sealing groove at an outer surface of the buckle assembly 4 is compressed and deformed under this locking action, effectively blocking any vapor penetration path.

In this embodiment, the design of the symmetrical distribution of the bosses and the recesses ensures that each point is evenly stressed during locking, thereby avoiding the risk of structural deformation caused by excessive local stress. The buckle assembly achieves quick disassembly and assembly, and has high-reliability locking and sealing protection functions.

In summary, the present disclosure relates to the soffit light, which mainly includes the waterproof light strip and the detachable mounting units. The waterproof light strip is encapsulated using the transparent housing, and the multiple light-emitting modules are provided at equal intervals on the internal substrate to form a continuous waterproof lighting body. Each light-emitting module is provided with an independent mounting unit, wherein the mounting unit includes the mounting base and the upper cover. The mounting base is provided with the horizontal support element and the lateral mounting element with the mounting holes suitable for ceiling mounting/lateral mounting. The annular sidewall of the upper cover is provided with the limiting grooves having the sawtooth structure to fix the light strip, and the lens with the diffusion angle of 80-120° is arranged in the light-transmitting top plate to allow the adjacent light spots to superimpose seamlessly. The mounting base and the upper cover are locked by the symmetrically distributed buckle assemblies, and the force generated by the engagement of the bosses and the hooks of the recesses clamps the corresponding light-emitting module between the light-transmitting top plate and the support element. Meanwhile, the sealing member of the buckle assembly achieves dust and water resistance. The overall structure is made of UV-resistant modified polycarbonate, which has high weather resistance, mounting flexibility, as well as uniform and continuous lighting effects, therefore particularly suitable for customized lighting solutions on outdoor building eaves.

The descriptions of the processes or structures corresponding to the above figures have different emphases. For parts that are not described in detail in a certain process or structure, please refer to the relevant descriptions of other processes or structures.

The above embodiments are only used to illustrate the principle and effect of the present disclosure, and are not intended to limit the present disclosure. Anyone familiar with the technology may modify or alter the above embodiments without departing from the spirit and scope of the present disclosure. Therefore, all equivalent modifications or changes made by those having ordinary skills in the art without departing from the spirit and technical ideas disclosed by the present disclosure should still be covered by the claims of the present disclosure.

The invention claimed is:

1. A soffit light, comprising:

a waterproof light strip comprising:

a transparent housing;

an internal substrate, wherein the transparent housing and the internal substrate form an integrated sealing structure; and multiple light-emitting modules arranged at equal intervals along a length direction of the waterproof light strip, wherein the transparent housing is disposed around the internal substrate on which the multiple light-emitting modules are fixed, to form a continuous waterproof layer; and multiple mounting units, wherein the mounting units correspond to the light-emitting modules, respectively; wherein each of the mounting units comprises:

a mounting base, provided with a horizontal support element for loading one corresponding light-emitting module;

an upper cover, provided with a light-transmitting top plate and an annular sidewall, wherein the annular sidewall extends vertically from a periphery of the light-transmitting top plate, and a left side and a right side of the annular sidewall are symmetrically provided with a limiting groove, respectively, to allow the waterproof light strip to pass through the mounting unit;

a buckle assembly, configured to lock the mounting base and the upper cover, so as to clamp and secure the corresponding light-emitting module between the horizontal support element and the light-transmitting top plate.

2. The soffit light according to claim 1, characterized in that the light-transmitting top plate is provided with a lens, wherein the lens covers a light-emitting surface of the corresponding light-emitting module, and has a preset diffusion angle, so that light spots of adjacent light-emitting modules of the multiple light-emitting modules form a continuous and seamless superimposed lighting region.

3. The soffit light according to claim 2, characterized in that the preset diffusion angle is 80°≤a≤120°.

4. The soffit light according to claim 2, wherein a surface of the lens is provided with micro-prism structures distributed in concentric circles, each prism unit of the micro-prism structures having a radius of curvature configured such that emitted light is distributed to have a concentrated center and gradually diffused edges in a horizontal direction.

5. The soffit light according to claim 1, characterized in that the buckle assembly comprises:

at least one pair of bosses, circumferentially spaced and distributed on the horizontal support element of the mounting base;

multiple recesses, correspondingly provided on the annular sidewall of the upper cover;

wherein when the upper cover is snapped onto the mounting base, the at least one pair of bosses engage the recesses to form locking.

6. The soffit light according to claim 1, characterized in that the mounting base further comprises a lateral mounting element, wherein the lateral mounting element is perpendicular to the horizontal support element;

a first mounting hole is provided on the horizontal support element, and a second mounting hole is provided on the lateral mounting element to realize ceiling mounting or lateral mounting of the soffit light.

7. The soffit light according to claim 6, characterized in that the horizontal support element and the lateral mounting element are integrally formed.

8. The soffit light according to claim 1, characterized in that an edge of each of the limiting grooves in contact with the waterproof light strip is provided with a sawtooth structure for clamping and securing the waterproof light strip.

9. The soffit light according to claim 1, characterized in that an interval between adjacent light-emitting modules is 10 mm≤L≤80 mm.

10. The soffit light according to claim 1, characterized in that the upper cover and the mounting base are both made of UV-resistant modified polycarbonate.

* * * * *